(12) United States Patent
Lam et al.

(10) Patent No.: US 8,545,010 B2
(45) Date of Patent: Oct. 1, 2013

(54) DUAL LENS EYEGLASSES

(75) Inventors: Yin Sang Lam, Honk Kong (HK); Yan Zhang, Hong Kong (HK); Yousheng Wang, Shenzhen (CN)

(73) Assignee: Okia Optical Co. Ltd, Kowloon (HK)

( * ) Notice: Subject to any disclaimer, the term of this patent is extended or adjusted under 35 U.S.C. 154(b) by 0 days.

(21) Appl. No.: 13/279,350

(22) Filed: Oct. 24, 2011

(65) Prior Publication Data

US 2012/0099074 A1     Apr. 26, 2012

(30) Foreign Application Priority Data

Oct. 26, 2010    (CN) ...................... 2010 2 0577324 U

(51) Int. Cl.
*G02C 7/10*          (2006.01)

(52) U.S. Cl.
CPC ........................................ *G02C 7/10* (2013.01)
USPC ................................ 351/44; 351/83; 351/154

(58) Field of Classification Search
CPC ......................................................... G02C 7/10
USPC ................ 351/41, 44, 47–49, 57–58, 83–89, 351/103–110, 154
See application file for complete search history.

(56) References Cited

U.S. PATENT DOCUMENTS

| | | | | |
|---|---|---|---|---|
| 4,921,341 A | * | 5/1990 | Ace | ................................. 351/86 |
| 5,526,068 A | * | 6/1996 | Markovitz | ....................... 351/44 |
| 6,820,977 B1 | * | 11/2004 | Lu | ................................. 351/57 |

* cited by examiner

*Primary Examiner* — Huy K Mai
(74) *Attorney, Agent, or Firm* — Ella Cheong Hong Kong; Sam T. Yip

(57) ABSTRACT

The present invention relates to dual-lens eyeglasses including an eyeglass frame and two lens units permanently installed on the eyeglass frame. Each lens unit includes two lenses arranged in optical alignment with each other. The lenses can be optical lenses or sunglass lenses. The optical lenses can be selected from known lenses such as corrective lenses, myopic corrective lenses, reading glasses lenses, progressive lenses, etc. The sunglass lenses can be selected from polarized lenses, tinted lenses, or photochromic lenses. Without the use of sub-frames, two lens units are permanently installed on eyewires of the eyeglass frames, enhancing the integration effect of the eyeglass frames. In addition, each lens is directly fixed and installed on the eyeglass frames, so that the installation is reliable and the lenses will not fall off easily. Furthermore, the lenses can be easily installed on full-rim, half-rim or rimless eyeglass frame.

9 Claims, 4 Drawing Sheets

DUAL LENS EYEGLASSES

CROSS-REFERENCE TO RELATED APPLICATIONS

The present application claims priority to Chinese utility model application number 201020577324.9 filed Oct. 26, 2010, the disclosure of which is incorporated by reference herein.

TECHNICAL FIELD

The present invention relates to eyewear and, more particularly, dual-lens eyeglasses.

BACKGROUND OF THE INVENTION

Eyeglasses play an important role in eye protection and clinical treatment of eye diseases. Through wearing glasses, children with strabismus resulting from refractive abnormalities and patients with conditions as diverse as refractive abnormalities or headaches can be treated through wearing eyeglasses. The eyeglass frame, as the eyewear portion that supports a lens, also has aesthetic and decorative effects. Modern fashion trends stress that eyewear coordinate with facial make-up, clothing, and accessories, so as to reflect the high social status, good education, fashion consciousness, etc., of the wearer.

With the rapid development of technology, continuous improvement of cultural and living standards of people, as well as the promotion of eyesight care, eyewear plays an increasingly important role in people's lives. However, the eyeglasses worn by most wearers use transparent optical lenses, which cannot protect the eyes of near-sighted persons under strong sunlight. Moreover, in view of an increasingly deteriorating ecological environment, solar radiation will be more severe, resulting in more harm to near-sighted persons. To solve this problem, a solution has been developed, in which two sunglass lenses are fixed on a sub-frame, which are then attached to the eyeglass frame. However, firstly, the eyeglass frame according to this solution has poor overall integration, resulting in a poor aesthetic appearance; secondly, the installation is not secure, and the sub-frame can easily fall off from the main frame when the wearer's motion is slightly more vigorous. Currently, there is one type of sunglass lens with a refractive error correction function on the market, but the production process is complicated and the sunglass price is high.

SUMMARY OF THE INVENTION

The present invention provides dual-lens eyeglasses to solve the afore-mentioned technical problems.

The technical solution of the present invention is to make dual-lens eyeglasses including an eyeglasses frame having two lens frames and two lens units installed on the lens frames of the eyeglasses frame, wherein each of the lens units includes two lenses arranged in optical alignment with each other.

In the dual-lens glasses according to the present invention, the two lenses can be the same type of lenses or different types of lenses.

In the dual-lens glasses according to the present invention, the two lenses can be spaced apart or be positioned to be close to each other (including contacting each other).

In one embodiment, the dual-lens glasses according to the present invention include an eyeglass frame with two eyewires, and each eyewire holds one dual-lens lens unit.

As used herein, the term "eyewire" is used in its technical sense in the ophthalmology art; that is, the rim that surrounds the lens in an eyeglass frame. However, the term also applies to rimless and partial/half rim glasses. In this sense, it means a support element for the eyeglass lens whether that support fully or partially surrounds the lens or whether the lens is attached to the remainder of the eyeglass frames by fasteners as in rimless glasses. Further, although the word "wire" is used for historical reasons, it is understood that support elements for lenses can be made of a variety of materials other than wire-including but not limited to various kinds of polymers, nylon cords, non-wire metal materials, and combinations thereof. Thus the term "eyewire" is meant to be construed in a broad sense relating to the holding mechanism for lenses in eyewear and not in the literal sense suggested by the word "wire."

In one embodiment, the inner wall of each eyewire has two grooves, and each of the lens units is installed on one groove, wherein the lens edge shape matches the corresponding groove.

In another embodiment, the dual-lens eyeglasses according to the present invention feature an eyeglass frame having two eyewires, and each eyewire holds one lens unit. The inner wall of each lens frame has one groove, and two lenses are installed together on the groove, such that the groove matches with the edge shape of the two lenses when the lenses contact each other.

In a further embodiment, the dual-lens glasses have an eyeglass frame with two eyewires; each of these two eyewires corresponds to one lens unit and each eyewire is a half rim frame structure. There are two rim wires between the two free ends of the half rims. The external wall of each lens has a groove suitable for accommodating the rim wire. The lenses are installed on said lens frame by the rim wire and the lens groove.

In another version, the dual-lens glasses have a frame including two eyewires; each eyewire holds one lens unit. Each eyewire includes one full rim and one half rim arranged in optical alignment with each other. The inside edge of the full rim has one groove, and there is one rim wire between the two free ends of the half rim. The groove is configured to tightly accommodate the edge shape of one lens while the bottom of the other lens has a groove suitable for the rim wire. The other lens is installed on said half rim through the interaction of the rim wire and the lens groove.

In the dual-lens glasses of the present invention, the full rim and the half rim can be detachably connected, permanently connected, or formed as an integral structure.

For rimless dual-lens eyeglass frames, two lenses in contact with one another are installed in optical alignment and fastened to the eyeglass frame with fasteners such as screws.

The lenses for the dual-lens glasses can be optical lenses, tinted lenses, or sunglass lenses or a combination thereof.

The dual-lens glasses of the present invention have the following advantages: without the use of a sub-frame, two lens units are installed on the each eyewire of an eyeglass frame, wherein each lens unit includes two lenses arranged in optical alignment with each other, thereby enhancing the integration of the eyeglass frames. Because each lens is directly fixed and installed on an eyewire of an eyeglasses frame, the installation is reliable and the lenses will not fall off easily. Furthermore, the lenses can be easily installed on full-rim, half-rim or rimless eyeglass frames.

DETAILED DESCRIPTION OF THE INVENTION

The detailed description of the present invention is made in combination with the attached figures and discussion of specific embodiments. The drawings and specific embodiments are for the purpose illustrating the objectives, technical solutions and advantages of the present invention and not for limiting the present invention.

According to the present invention, two eyewires are provided which respectively correspond to the left eye and right eye. Each eyewire includes two lenses, that is, the eyeglass frames of the dual-lens eyeglasses of the present invention accommodate four lenses, with two lenses for each eye. Moreover, the two lenses of each lens unit can be of the same or different lens types. The lenses can be made of same material or different materials, and have the same or different purposes and functions. Exemplary lenses can be optical lenses or sunglass lenses. The optical lenses can be selected from a variety of known lenses, including, but not limited to, myopic corrective lenses, reading glasses lenses, progressive lenses, etc. The sunglass lenses can be selected from a variety of known sunglass lenses, including, but not limited to, polarized lenses, tinted lenses, or photochromic lenses. An exemplary lens unit can be formed from one polarized lens and one optical lens. It should be understood that the eyeglasses frames can be made of any suitable material for supporting the lenses including but not limited to metal or plastic/polymer materials or combinations thereof.

In a specific embodiment, the two lenses corresponding to each eye are arranged in optical alignment with each other and are installed within an eyewire of the eyeglasses frame so as to form a lens unit. Further, the two lenses arranged in optical alignment with each other and can be spaced apart from each other or contacting each other, depending upon the desired optical function. Optionally, the dual lenses may be adhered to each other through thermal adhesion, adhesive bonding material, or any other system to form an integral dual-lens unit. Thus the dual-lens glasses are installed with a lens set of dual lenses for each eye.

Figure 1:
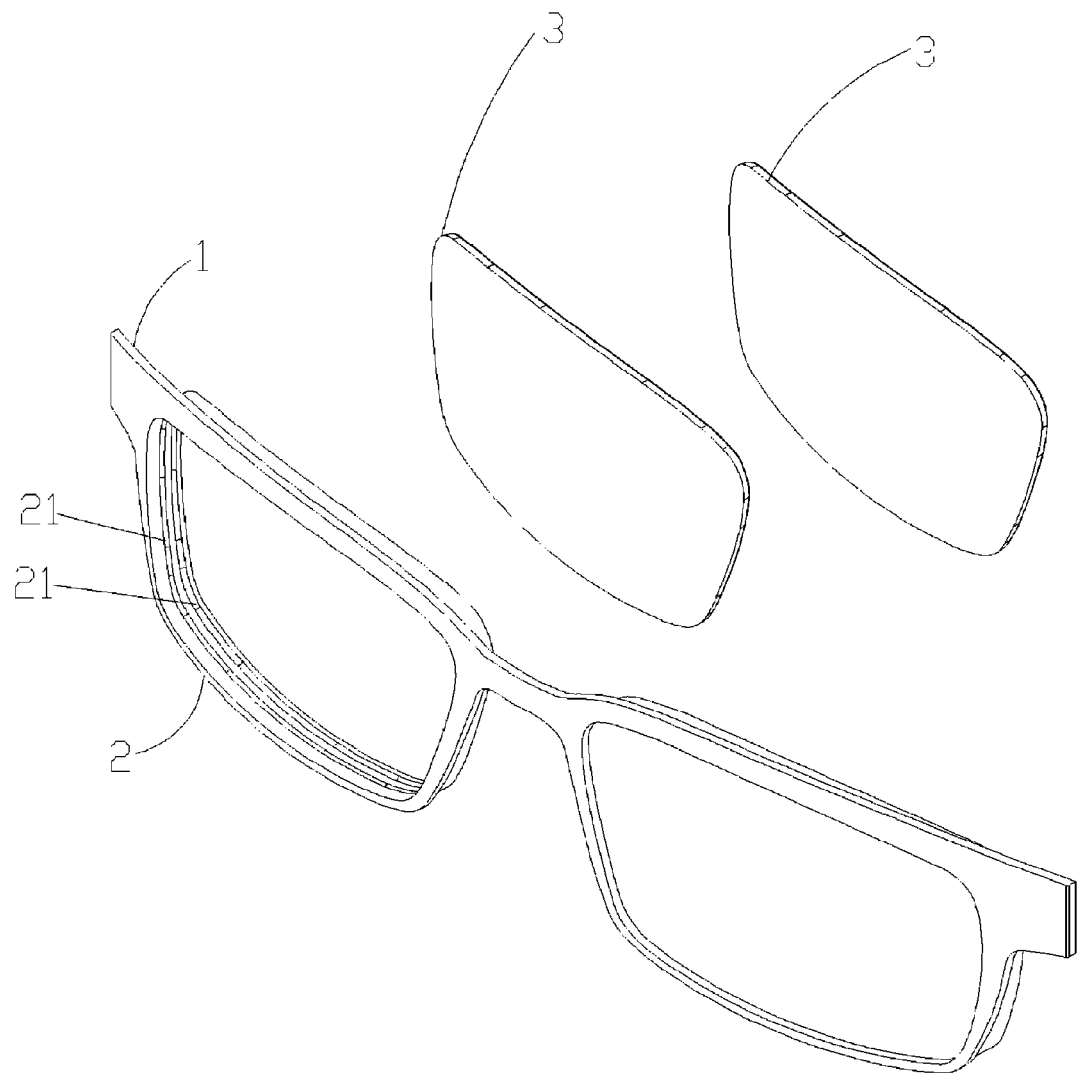
FIG. 1 is a diagram of dual-lens eyeglasses having eyewires with two-groove according to one embodiment of the present invention.

As described above, the technical solution of the present invention includes an improvement of the front portion of eyeglass lens frames. The portion of the frame positioned at the temple of the wearer can be selected from any conventional configuration and is not depicted in the drawings for the sake of clarity, According to the first embodiment as shown in FIG. 1, the eyeglass frame 1 have two eyewires 2, with each eyewire 2 accommodating one lens unit. The inner wall of each eyewire has two grooves 21 and the width of each groove 21 matches the edge thickness of the lens 3 to be installed. The depth of each groove 21 can be flexibly designed, provided that the lens is firmly installed. If the two lenses 3 have the same shape, the two grooves on the eyewire 2 used for installing the lens 3 can also have the same shape so that a specific installation order sequence is not required, that is, each lens can be freely installed in each groove. It is understood that when the two lenses 3 have different shapes, each groove 21 is configured for each specific lens 3, and an installation sequence order is required for the two lenses 3, that is, one lens 3 can only be installed on one specific groove 21. In the latter embodiment, the two lenses 3 are installed on different grooves 21. Therefore, there is a gap between the two lenses after installation.

Figure 2:
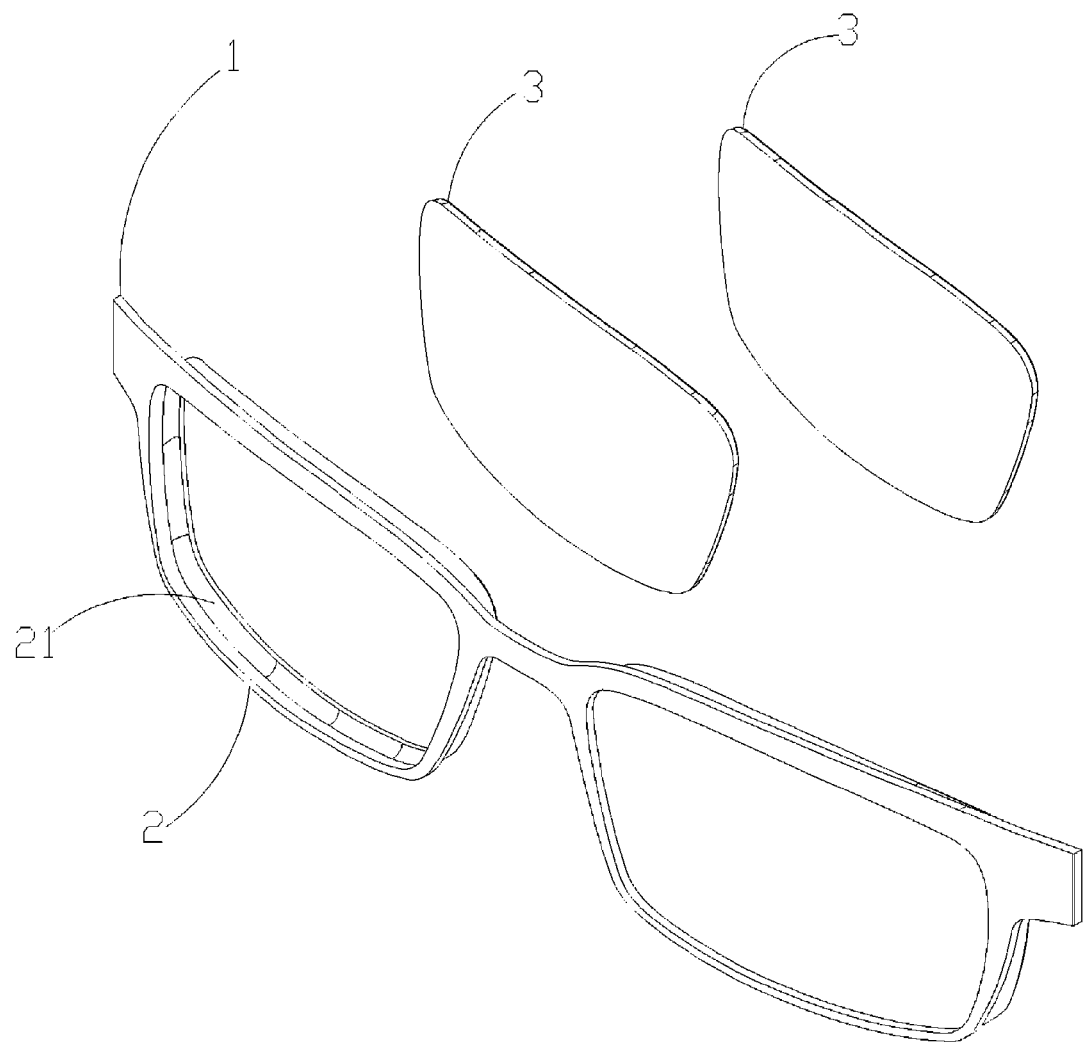
FIG. 2 is a diagram of dual-lens eyeglasses having eyewires with one-groove according to another embodiment of the present invention.

According to the embodiment shown in FIG. 2, the eyeglasses frame 1 includes two eyewires 2, with one eyewire 2 accommodating one integrated lens unit. As compared to the first embodiment, the difference in the second embodiment is that the inner wall of each eyewire 2 has only one groove 21, that is, the two lenses 3 are installed on the same groove 21. Thus, the two lenses arranged in optical alignment with each other are in contact after installation, and the width of the groove 21 should match the edge thickness of the integrated lens unit including two lenses 3, so as to fit the two lenses 3 therein.

Thus, as shown in FIGS. 1 and 2, the eyewires of the eyeglasses have a full-rim frame structure. It is understood that the eyewires can also have a half-rim frame structure with a downward opening.

Figure 3:
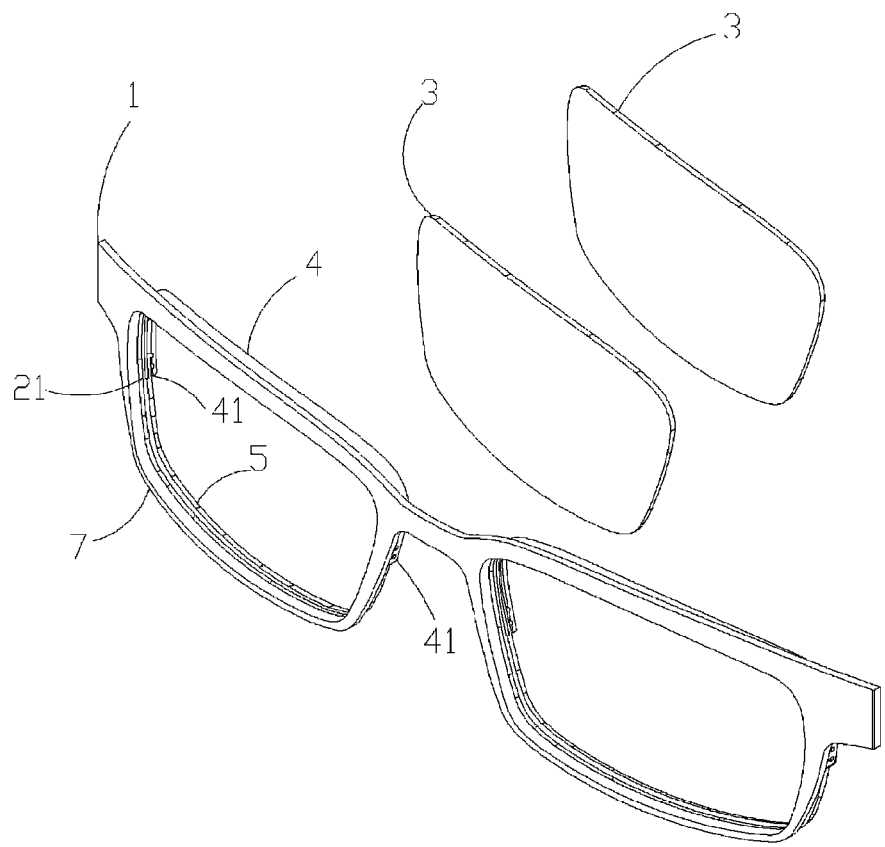
FIG. 3 is a diagram of dual-lens eyeglasses having one full rim and one half rim according to another embodiment of the present invention.

According to the embodiment shown in FIG. 3, the eyeglass frame 1 has two eyewires, with each eyewire holding one lens unit; each eyewire comprises a full rim 7 and a half rim 4 which are arranged in optical alignment with each other. In a specific embodiment, the full rim 7 and half rim 4 can be detachably connected, permanently connected, or an integral structure. The inner wall of the full rim 7 has one groove 21, and there is one rim wire 7 between the two free ends 41 of the half rim 4. In one example, the rim wire can be fishing wire (e.g., nylon cord) or any other wire made of the materials having suitable flexibility and strength to support lenses. In the same embodiment, the groove 21 is suitable for the edge shape of one lens 3 for a tight fit, and the bottom of the other lens 3 has a groove suitable for the rim wire (not shown in the figure). The other lens 3 is installed on the half rim 4 by means of the rim wire 5. The upper edge wall of the lens 3 can tightly push against the inner wall of the half rim 4, or a groove accommodating the upper edge wall of the lens 3 can be configured in the inner wall of the half rim 4, so as to install the upper side wall of the lens 3 on the groove of the half rim 4 to achieve secure installation.

It is understood that the eyeglasses frame has two eyewires, with one eyewire corresponding to one lens unit; each eyewire is of half rim structure with a downward opening, and there are two rim wires between the two free ends of the half rims; the edge wall of each lens has a groove suitable for the rim wire; the lenses are installed on the eyewire by means of the rim wire and the lens groove. Thus, it can be seen that the dual-lens structure is applicable to both full-rim and half-rim eyewires.

Figure 4:
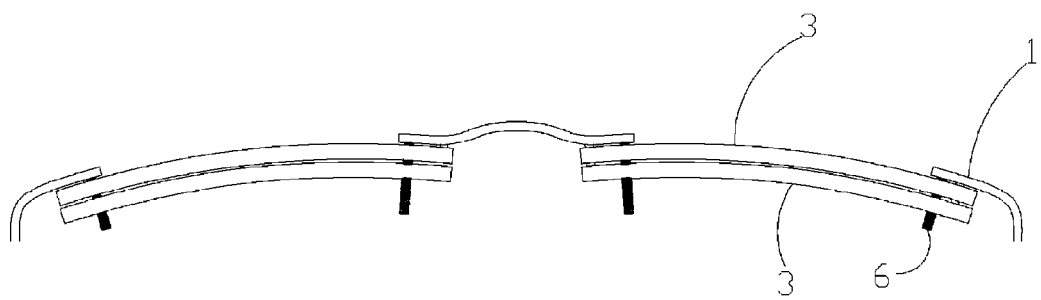
FIG. 4 is a diagram of rimless dual-lens eyeglasses according to a further embodiment of the present invention.
Figure 5:
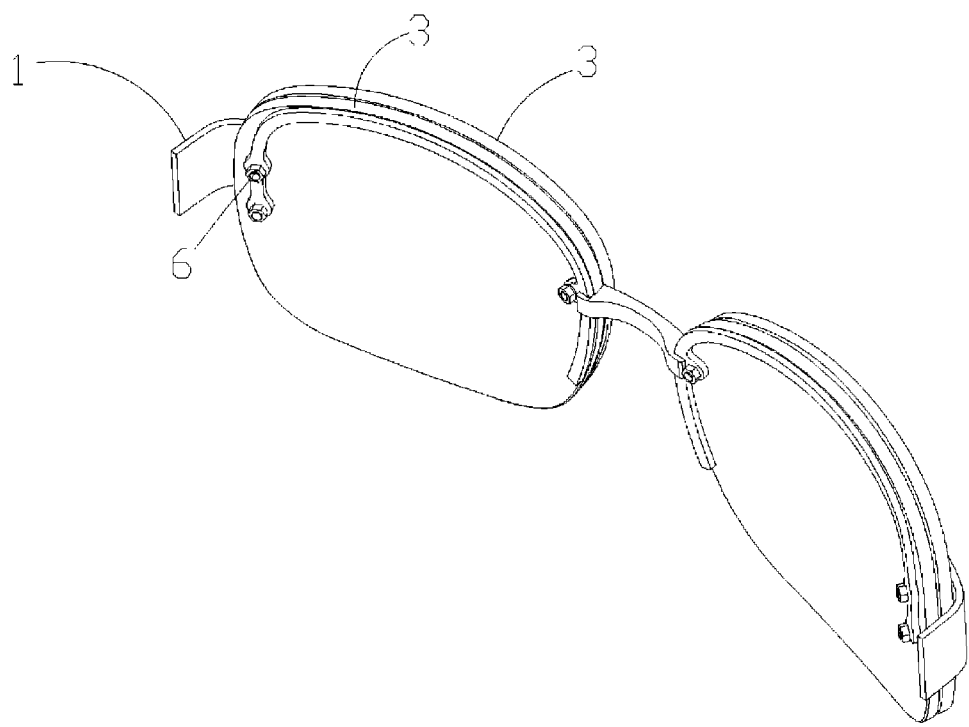
FIG. 5 is a diagram of rimless dual-lens eyeglasses according to another embodiment of the present invention.

Moreover, when the dual-lens structure is used for rimless frames, according to the embodiments shown in FIGS. 4 and 5, the two lenses 3 contact each other and corresponding holes are formed on one side of the two lenses 3, so that the two lenses can be fixed with fasteners such as screws 6, and further fixed on the eyeglasses frame 1, thus achieving the application of the dual-lens structure to rimless frames.

The present invention is described by using a number of embodiments, and those skilled in the art should understand that variations and equivalent substitutions can be made to this invention without departing from the scope of the present invention. In addition, under specific situations or circumstances, variations can be made to the present invention without departing from the scope of this invention. Accordingly, the present invention is not limited by the embodiments disclosed herein, but should include all embodiments falling within the scope of the claims appended to the present invention.

The invention claimed is:

1. A pair of eyeglasses including dual lenses for each eyewire, the eyeglasses comprising:
    an eyeglass frame selected from full rim or half-rim eyeglass frames;
    two eyewires, each eyewire configured to permanently retain a set of dual lenses in each respective frame;
    a pair of dual lens sets configured such that one of the pair of dual lens sets is retained by each eyewire, each lens of the dual lens set being independently selected from optical lenses and sunglass lenses and each lens of the dual lens set being in optical alignment with the other lens of the dual lens set;
    each lens of the dual lens set being spaced apart from the other lens of the dual lens set or each lens of the dual lens set contacting the other lens of the dual lens set,
    wherein each of said eyewires has a half rim structure and there are two rim wires arranged in line with each other between the two free ends of said half rim; the edge of each lens has a groove accommodating said rim wires; and
    said lenses are installed on said eyewire by means of said rim wires and said lens groove.

2. The pair of eyeglasses including dual lenses for each eyewire according to claim 1, wherein an inner wall of each of the eyewires has two grooves, and one lens of the dual lens set is installed on each corresponding groove, wherein a lens edge shape is configured to be retained in the corresponding groove.

3. The pair of eyeglasses including dual lenses for each eyewire according to claim 1, wherein an inner wall of each of said eyewires has one groove, and the two lenses of the dual lens set are installed on said one groove, wherein said one groove is configured to retain an edge shape of a dual lens set in which each lens of the dual lens set contacts the other lens of the dual lens.

4. The pair of eyeglasses including dual lenses for each eyewire according to claim 1 wherein the dual lenses are adhered to each other.

5. A pair of eyeglasses including dual lenses for each eyewire, the eyeglasses comprising:
    an eyeglass frame selected from full rim or half-rim eyeglass frames;
    two eyewires, each eyewire configured to permanently retain a set of dual lenses in each respective frame;
    a pair of dual lens sets configured such that one of the pair of dual lens sets is retained by each eyewire, each lens of the dual lens set being independently selected from optical lenses and sunglass lenses and each lens of the dual lens set being in optical alignment with the other lens of the dual lens set;
    each lens of the dual lens set being spaced apart from the other lens of the dual lens set or each lens of the dual lens set contacting the other lens of the dual lens set,
    wherein each of said eyewires comprises one full rim and one half rim arranged in line with each other; the inner wall of said full rim has one groove, and there is one rim wire between the two free ends of said half rim; and
    wherein said groove accommodates the edge shape of one lens for tight fit, and the bottom of the other lens has a groove accommodating the rim wire;
    said other lens is installed on said half rim by means of said rim wire and said lens groove.

6. The pair of eyeglasses including dual lenses for each eyewire according to claim 5, wherein an inner wall of each of the eyewires has two grooves, and one lens of the dual lens set is installed on each corresponding groove, wherein a lens edge shape is configured to be retained in the corresponding groove.

7. The pair of eyeglasses including dual lenses for each eyewire according to claim 5, wherein an inner wall of each of said eyewires has one groove, and the two lenses of the dual lens set are installed on said one groove, wherein said one groove is configured to retain an edge shape of a dual lens set in which each lens of the dual lens set contacts the other lens of the dual lens.

8. The pair of eyeglasses including dual lenses for each eyewire according to claim 5 wherein the dual lenses are adhered to each other.

9. The pair of eyeglasses including dual lenses for each eyewire according to claim 5, wherein said full rim and half rim are permanently connected or in an integral structure.

* * * * *